United States Patent
Skrzypczak et al.

(10) Patent No.: US 9,558,225 B2
(45) Date of Patent: Jan. 31, 2017

(54) EVENT STREAM PROCESSOR

(71) Applicants: Joe Skrzypczak, Ontario (CA);
Andrzej Kucharczyk, Onatario (CA);
Andrew Frantz, Moorestown, NJ (US);
Gerald Wang, Beijing (CN); Mark Theiding, Alameda, CA (US)

(72) Inventors: Joe Skrzypczak, Ontario (CA);
Andrzej Kucharczyk, Onatario (CA);
Andrew Frantz, Moorestown, NJ (US);
Gerald Wang, Beijing (CN); Mark Theiding, Alameda, CA (US)

(73) Assignee: SYBASE, INC., Dublin, CA (US)

( * ) Notice: Subject to any disclaimer, the term of this patent is extended or adjusted under 35 U.S.C. 154(b) by 222 days.

(21) Appl. No.: 14/228,871

(22) Filed: Mar. 28, 2014

(65) Prior Publication Data

US 2015/0169661 A1   Jun. 18, 2015

Related U.S. Application Data

(60) Provisional application No. 61/916,522, filed on Dec. 16, 2013.

(51) Int. Cl.
*G06F 17/30* (2006.01)

(52) U.S. Cl.
CPC ... *G06F 17/30339* (2013.01); *G06F 17/30345* (2013.01)

(58) Field of Classification Search
CPC .................................................. G06F 17/30339
See application file for complete search history.

(56) References Cited

U.S. PATENT DOCUMENTS

| 7,512,829 | B2 | 3/2009 | Mital et al. |
| 8,024,480 | B2 | 9/2011 | DiStefano |
| 8,374,986 | B2 | 2/2013 | Indeck et al. |
| 8,447,739 | B2 | 5/2013 | Naibo et al. |
| 8,589,949 | B2 | 11/2013 | Biazetti et al. |
| 8,655,825 | B2 | 2/2014 | Roesch et al. |
| 2011/0016123 | A1 | 1/2011 | Pandey et al. |
| 2011/0016160 | A1 | 1/2011 | Zhang et al. |
| 2011/0314019 | A1 | 12/2011 | Peris et al. |
| 2012/0290529 | A1* | 11/2012 | Baleedpalli ....... G06F 17/30345 707/609 |
| 2013/0046725 | A1 | 2/2013 | Cammert et al. |
| 2013/0160024 | A1 | 6/2013 | Shtilman et al. |
| 2013/0346390 | A1 | 12/2013 | Jerzak et al. |
| 2014/0006384 | A1 | 1/2014 | Jerzak et al. |

(Continued)

OTHER PUBLICATIONS

Heinz et al. "Event Data Warehousing for Complex Event Processing", Mar. 7, 2010.*

*Primary Examiner* — Etienne Leroux
*Assistant Examiner* — Cindy Nguyen
(74) *Attorney, Agent, or Firm* — Schwegman Lundberg & Woessner, P.A.

(57) ABSTRACT

In an example embodiment, a method for performing event stream processing is provided. An event stream is received, the event stream comprising a real time indication of one or more events occurring. Then it is determined that the event stream is identified in a streaming publish service inside a database. The event stream may then be inserted directly into one or more database tables in the database based on the determining.

20 Claims, 14 Drawing Sheets

(56) References Cited

U.S. PATENT DOCUMENTS

2014/0136274 A1* 5/2014 Kieselbach ........ G06Q 10/0633
705/7.27
2014/0358959 A1* 12/2014 Bishnoi ............. G06F 17/30516
707/769

* cited by examiner

EVENT STREAM PROCESSOR

CROSS-RELATION TO RELATED APPLICATIONS

This application claims priority to U.S. Provisional Application No. 61/916,522 filed Dec. 16, 2013, which is hereby incorporated herein by reference in its entirety.

TECHNICAL FIELD

This document generally relates to systems and methods for use with event streams. More specifically, this document relates to methods and systems for event stream processing.

BACKGROUND

Event stream processing (ESP) is a set of technologies designed to assist the construction of event-driven information systems. ESP technologies may include event visualization, event databases, event-driven middleware, and event processing languages, or complex event processing (CEP). ESP deals with the task of processing multiple streams of event data with the goal of identifying the meaningful events within those streams. ESP enables applications such as algorithmic trading in financial services, radio frequency identification (RFID) event processing applications, fraud detection, process monitoring, and location-based services in mobile devices. ESP is generally limited to analyzing limited amounts of data; specifically, current ESP solutions are limited to analyzing the event streams in real time (e.g., the events happening right now) and events stored for limited windows (e.g., events that have happened in the last minute).

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a number of solutions are provided that allow ESP to be more fully integrated with and/or communicate with a database. This allows for ESP systems to perform complex analysis on data drawn from not only real time event data and windows, but also from stored database information.

Figure 1:
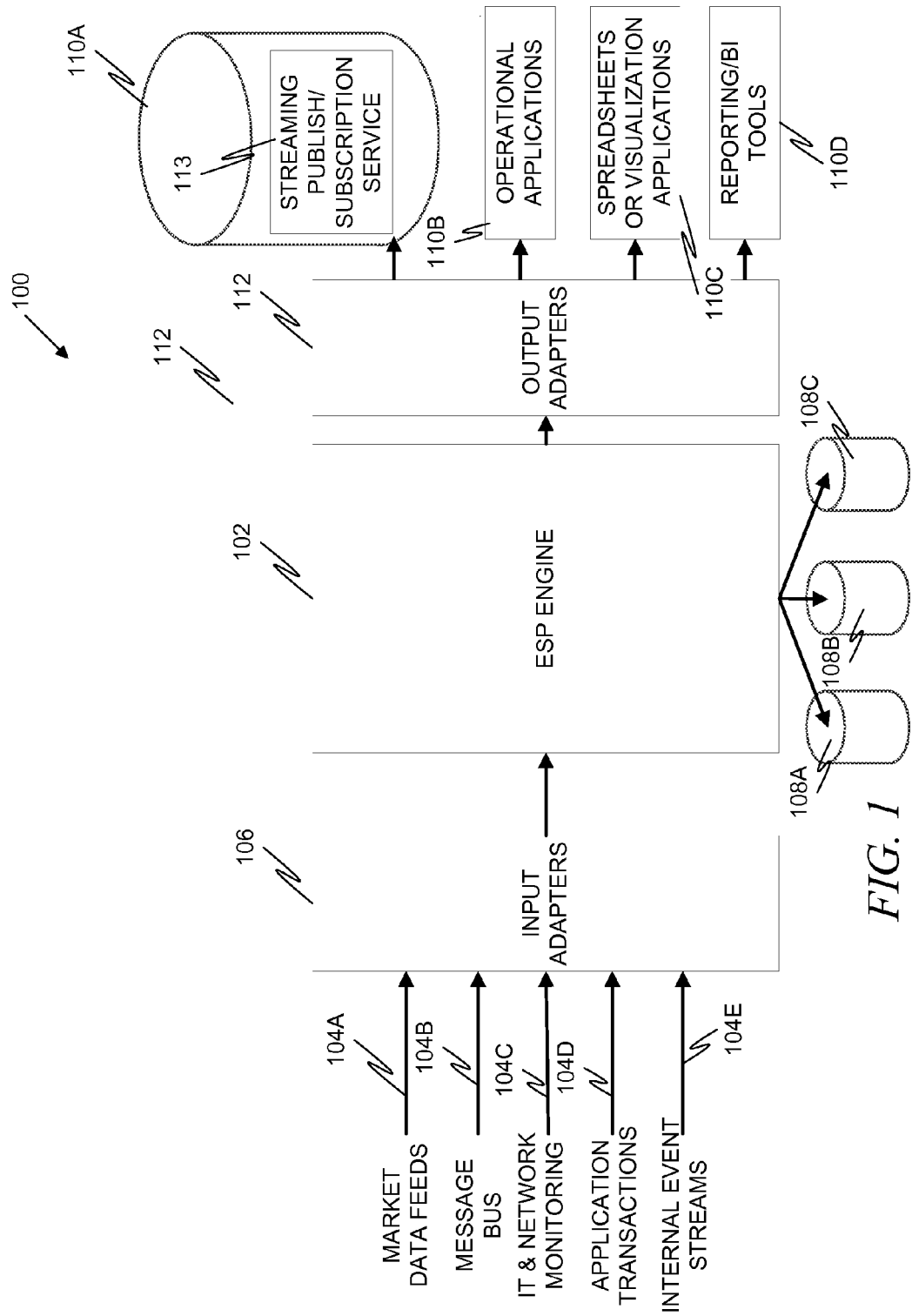
FIG. 1 is a diagram illustrating a system for event stream processing in accordance with an example embodiment.

FIG. 1 is a diagram illustrating a system 100 for event stream processing in accordance with an example embodiment. An ESP engine 102 may receive one or more event streams 104A-104E via input adapters 106. The event streams 104A-104E can relate to, for example, market data feeds, message buses, network monitoring, application transactions, internal event streams, etc. The ESP engine 102 may also communicate with one or more external databases 108A-108C. In an example embodiment, these external databases 108A-108C may be disk storage databases.

The ESP engine 102 may also communicate with an internal database 110A. In an example embodiment, the internal database 110A includes a streaming publish/subscription service 113 to perform complex analysis on data drawn from stored database information. The streaming publish/subscription service 113 is described in greater detail below in conjunction with FIG. 5. While this database 110A is labeled as internal, it is possible that the database 110A resides on separate hardware than the ESP engine 102. The distinction between an internal database 110A and external database 108A-108C is that the internal database 110A may be more natively supported for communication purposes with the ESP engine 102. In an example embodiment, the internal database 110A and ESP engine 102 are both designed by the same software provider, whereas the external databases 108A-108C are designed by other software providers. The communication between the ESP engine 102 and the internal database 110A may be performed via one or more output adapters 112. It should be noted that in some example embodiments the output adapters may not be necessary 112. Additionally, the ESP engine 102 may communicate with, for example, operational applications 110B, spreadsheets or visualization applications 110C, and reporting/business intelligence (BI) tools 110D.

In an example embodiment, the internal database 110A is an in-memory database. An in-memory database is a database management system that primarily relies on main memory for computer data storage. It is contrasted with database management systems that employ a disk storage mechanism.

Figure 2:
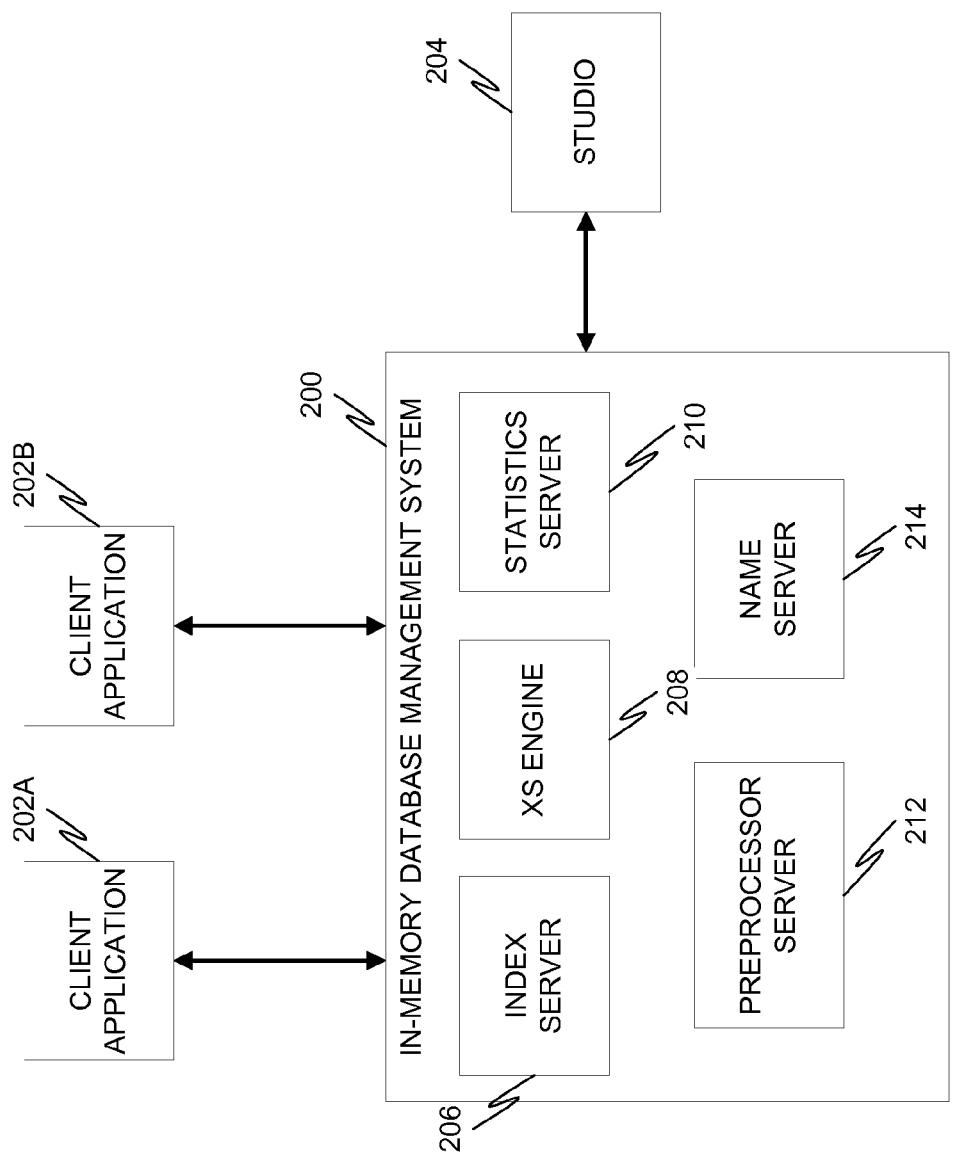
FIG. 2 is a diagram illustrating an in-memory database management system in accordance with an example embodiment.

FIG. 2 is a diagram illustrating an in-memory database management system 200 in accordance with an example embodiment. For example, the in-memory database management system may be the internal database 110A in FIG. 1. Here, the in-memory database management system 200 may be coupled to one or more client applications 202A, 202B. The client applications 202A, 202B may communicate with the in-memory database management system 200 through a number of different protocols, including Structured Query Language (SQL), Multidimensional Expressions (MDX), Hypertext Transfer Protocol (HTTP), Representational State Transfer (REST), and Hypertext Markup Language (HTML). As described earlier, one or more of these client applications 202A, 202B may be an ESP engine, such as, for example, ESP engine 102 from FIG. 1.

Also depicted is a studio 204, used to perform modeling by accessing the in-memory database management system 200. In an example embodiment, integration of ESP functionality (e.g., ADD) into the internal database occurs through studio 204. The studio 204 can allow complex analysis to be performed on data drawn from not only real time event data and windows, but also from stored database information.

The in-memory database management system 200 may comprise a number of different components, including index server 206, XS engine 208, statistics server 210, preprocessor server 212, and name server 214. These components may operate on a single computing device, or may be spread among multiple computing devices (e.g., separate servers).

The index server 206 contains the actual data and the engines for processing the data. It also coordinates and uses all the other servers.

The XS engine 208 allows clients to connect to the database system 100 using web protocols, such as Hypertext Transfer Protocol (HTTP).

The statistics server 210 collects information about status, performance, and resource consumption from all the other server components. The statistics server 210 can be accessed from the studio 204 to obtain the status of various alert monitors.

The preprocessor server 212 is used for analyzing text data and extracting the information on which the text search capabilities are based.

The name server 214 holds information about the database topology. This is used in a distributed system with instances of the database on different hosts. The name server 214 knows where the components are running and which data is located on which server.

Figure 3:
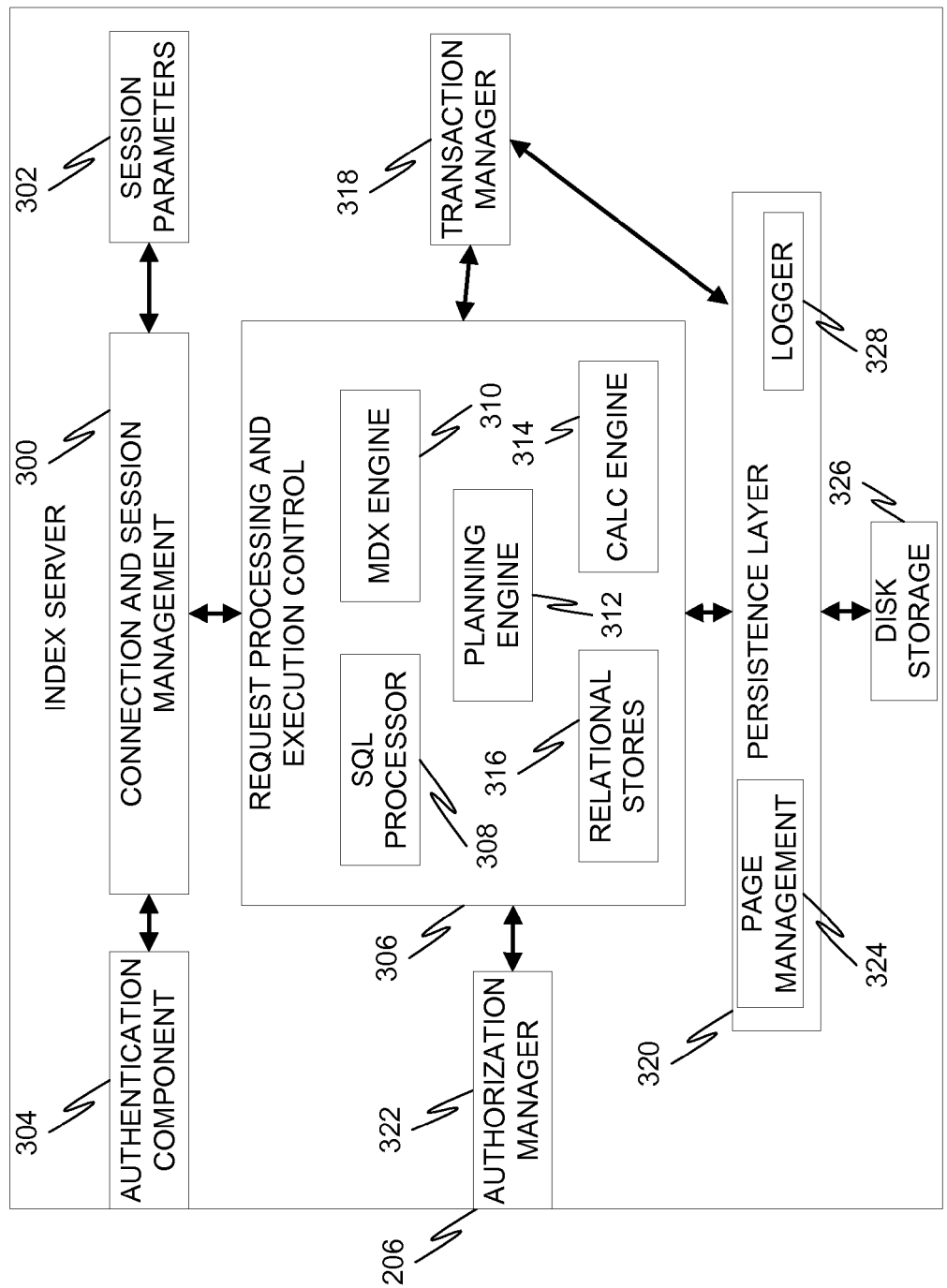
FIG. 3 is a diagram illustrating an index server in accordance with an example embodiment.

FIG. 3 is a diagram illustrating an index server 206 in accordance with an example embodiment. Specifically, the index server 206 of FIG. 2 is depicted in more detail. The index server 206 includes a connection and session management component 300, which is responsible for creating and managing sessions and connections for the database clients. Once a session is established, clients can communicate with the database system using SQL statements. For each session, a set of session parameters 302 may be maintained, such as auto-commit, current transaction isolation level, etc. Users (e.g., system administrators, developers) are authenticated either by the database system itself (e.g., login with user name and password, using authentication component 304) or authentication can be delegated to an external authentication provider such as a Lightweight Directory Access Protocol (LDAP) directory.

The client requests can be analyzed and executed by a set of components summarized as request processing and execution control 306. The SQL processor 308 checks the syntax and semantics of the client SQL statements and generates a logical execution plan. Multidimensional expressions (MDX) is a language for querying and manipulating multidimensional data stored in OLAP cubes. As such, an MDX engine 310 is provided to allow for the parsing and executing of MDX commands. A planning engine 312 allows applications (e.g., financial planning applications) to execute basic planning operations in the database layer. One such operation is to create a new version of a dataset as a copy of an existing dataset, while applying filters and transformations.

A calc engine 314 implements the various SQL script and planning operations. The calc engine 314 creates a logical execution plan for calculation models derived from SQL script, MDX, planning, and domain-specific models. This logical execution plan may include, for example, breaking up a model into operations that can be processed in parallel.

The data is stored in relational stores 316, which implement a relational database in main memory.

Each SQL statement may be processed in the context of a transaction. New sessions are implicitly assigned to a new transaction. The transaction manager 318 coordinates database transactions, controls transactional isolation, and keeps track of running and closed transactions. When a transaction is committed or rolled back, the transaction manager 318 informs the involved engines about this event so they can execute needed actions. The transaction manager 318 also cooperates with a persistence layer 320 to achieve atomic and durable transactions.

An authorization manager 322 is invoked by other database system components to check whether the user has the specified privileges to execute the requested operations. The database system allows for the granting of privileges to users or roles. A privilege grants the right to perform a specified operation on a specified object.

The persistence layer 320 ensures that the database is restored to the most recent committed state after a restart and that transactions are either completely executed or completely undone. To achieve this goal in an efficient way, the persistence layer 320 uses a combination of write-ahead logs, shadow paging, and save points. The persistence layer 320 also offers a page management interface 324 for writing and reading data to a separate disk storage 326, and also contains a logger 328 that manages the transaction log. Log entries can be written implicitly by the persistence layer 320 when data is written via the persistence interface or explicitly by using a log interface.

Figure 4:
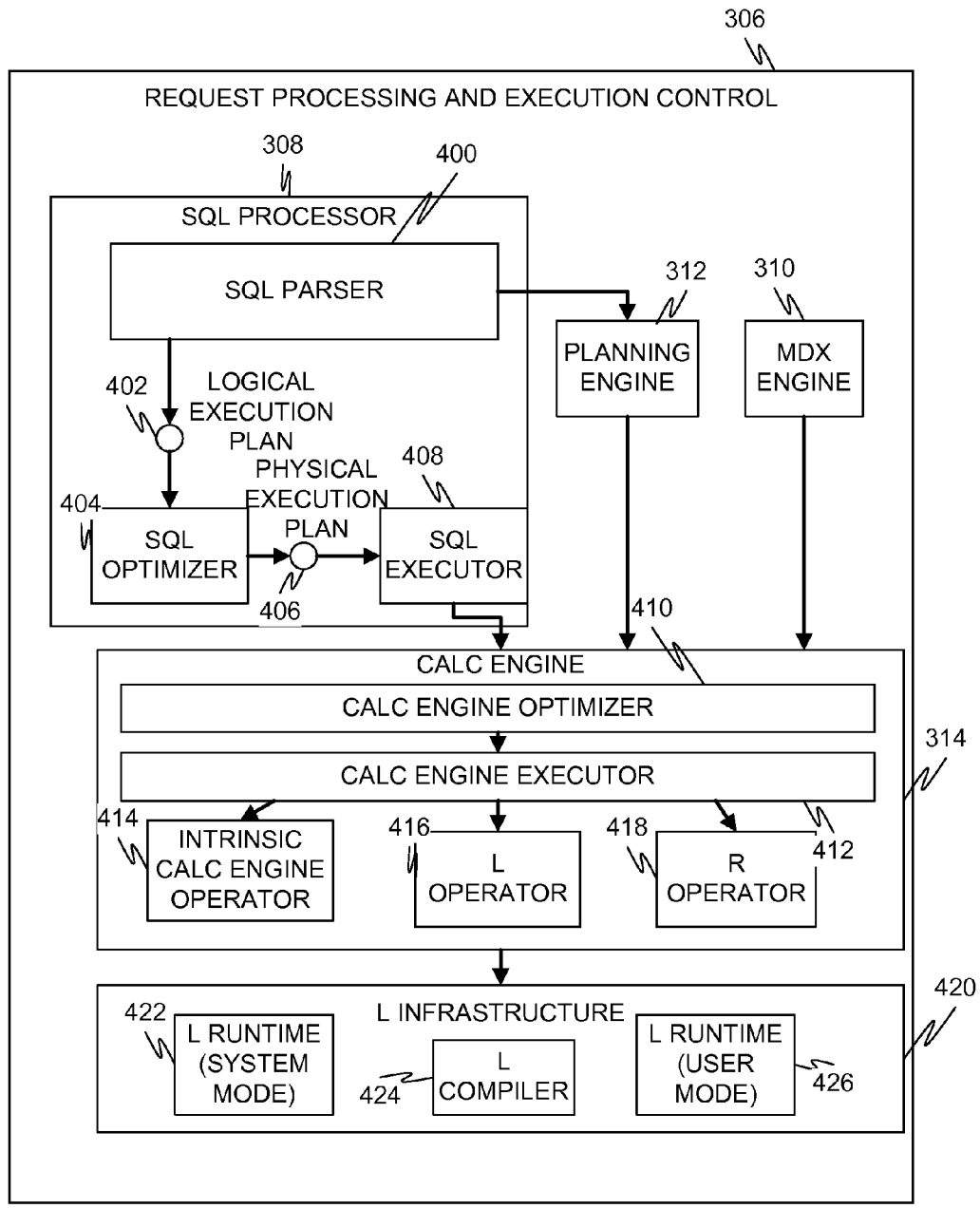
FIG. 4 is a diagram illustrating a request processing and execution control component in accordance with an example embodiment.

FIG. 4 is a diagram illustrating a request processing and execution control 306 in accordance with an example embodiment. This diagram depicts the request processing and execution control 306 of FIG. 3 in more detail. The SQL processor 308 contains an SQL Parser 400, which parses the SQL statement and generates a logical execution plan 402, which it passes to SQL optimizer 404. The SQL optimizer 404 then optimizes the logical execution plan 402 and converts it to a physical execution plan 406, which it then passes to SQL executor 408. The calc engine 314 implements the various SQL script and planning operations, and includes a calc engine optimizer 410, which optimizes the operations, calc engine executor 412, which executes the operations, as well as intrinsic calc engine operator 414, L operator 416, and R operator 418.

L infrastructure 420 includes a number of components to aid in the running of L procedures, including L-runtime (system mode) 422, L compiler 424, and L-runtime (User mode) 426.

As described briefly earlier, in an example embodiment, aspects of an ESP engine are integrated into an internal database, such as an in memory database. Integrating these aspects of an ESP engine into the internal database allows the user to seamlessly develop applications that contain traditional database as well as streaming capabilities.

In an example embodiment, the internal database provides a streaming publish service. This service allows continuous publishing of events directly into database tables in the internal database. This service may be optimized for high insert performance by buffering incoming data into multiple batches (to avoid the overhead of single inserts) and inserting batches in parallel against multiple table partitions. The user can configure the batch size to trade off insert performance and insert latency. The ESP engine may then utilize the publish service of the internal database to publish output streams directly into the internal database.

Figure 5:
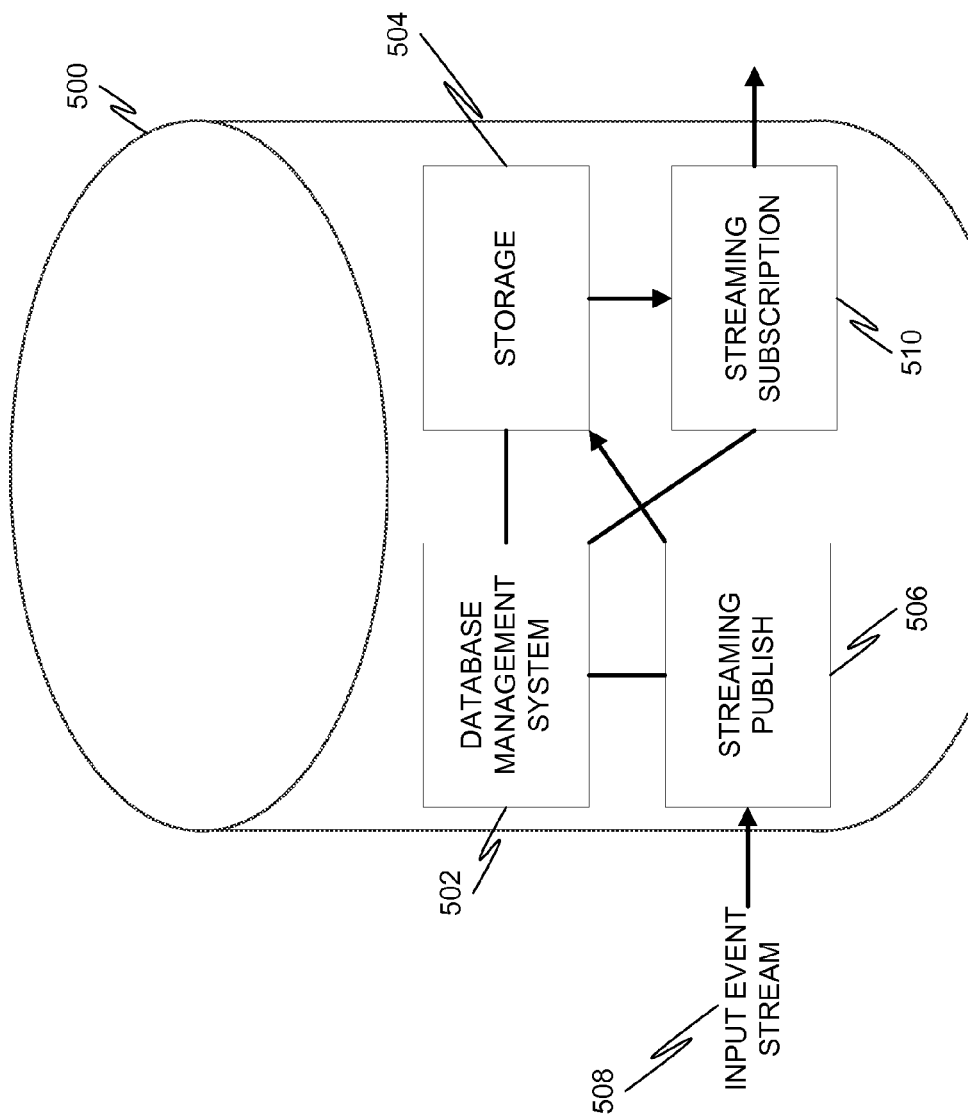
FIG. 5 is a diagram illustrating an internal database in accordance with an example embodiment.

FIG. 5 is a diagram illustrating an internal database 500 in accordance with an example embodiment. The internal database 500 may contain a management system 502 and storage 504. Additionally, a streaming publish service 506 is provided that can directly access incoming event streams 508 and insert the streams directly into the storage 504. Thus, event streaming data that traditionally was handled by an ESP engine can be accessed and stored by the internal database 500.

In another example embodiment, the internal database 500 may also provide a streaming subscription service 510. The service 510 allows an ESP engine to subscribe to multiple different types of events. For example, the ESP engine may subscribe to two different types of events. The first type of event can be table content. The content of any table in storage 504 can be streamed out to the subscribing ESP engine. Any new data added to the table can also be streamed out as well. Table content can also optionally be filtered. The second type of event can be table content changes. The changes to a table can be streamed out to a subscribing ESP engine. Each event may contain the new table record as well as a field indicating whether the change was an insert, update, or delete.

The ESP engine can then use the streaming subscription service 510 to offer an additional input stream into the ESP engine for the table content and/or table content changes.

As described earlier, traditional ESP functionality allows for event data to be analyzed in the form of both real-time streams and windows. Traditional ESP functionality also includes the ability to join streams and windows. In an example embodiment, through data integration, the ESP can also allow joining streams and windows with database tables. This allows for the possibility of including persisted data in real-time continuous queries.

ESP may access the table data during joins as needed, and fetch table data in real-time. Alternatively, table data may be cached based on user configuration.

Furthermore, traditional ESP functionality supports ad-hoc SQL queries into windows, where the window content at the time of the query behaves like a database table. In an example embodiment, with data integration, the user can submit ad-hoc SQL queries into the database that not only contain tables, but also ESP windows, using a single SQL command.

In an example embodiment, to support seamless development of applications with streaming and persisted data, a single tool is provided that offers traditional streaming features, such as creation of streaming models, debugging of streaming data flows, playback, etc., as well as traditional persisted data features, such as a SQL command interface, a query plan visualizer, etc.

In addition, a central mechanism may be provided to configure connectivity into the internal database. That connectivity is then used both for database tooling functionality as well as for streaming events from the ESP engine into the internal database.

In an example embodiment, a central explorer may be provided to list all available tables in the internal database. In order to publish events from an ESP engine into an internal database table, the user can directly drag a table from the explorer onto an ESP model.

Changes to the event schema (e.g., structure of an event) for streams/windows that publish into a table can be propagated automatically into the matching database schema. Correspondingly, changes to a database schema can be propagated automatically into the matching event schema.

Artifacts of a traditional database application, such as tables, procedures, etc., can be packaged together with a streaming project (streaming model plus deployment configuration) in a development package. The development package thus allows one-step deployment of applications that leverage both streaming and persisted data.

In another example embodiment, in order to support seamless monitoring and administration of applications with streaming and persisted data, a single tool may be provided that offers traditional streaming features (monitor streams, start/stop streaming projects, etc.) as well as traditional persisted data features (monitor SQL query execution times, submit SQL query, etc.). The entry point in the tool may be a diagram presenting the data flow through streams/windows into one or multiple databases. The user can review overall monitoring tasks (e.g., project throughput) and perform overall administration tasks (e.g., stop streaming project) from this overview diagram. For more specific tasks, such as queue depths of a specific stream, size of a table, etc., the user can drill down into the participating components.

Figure 6:
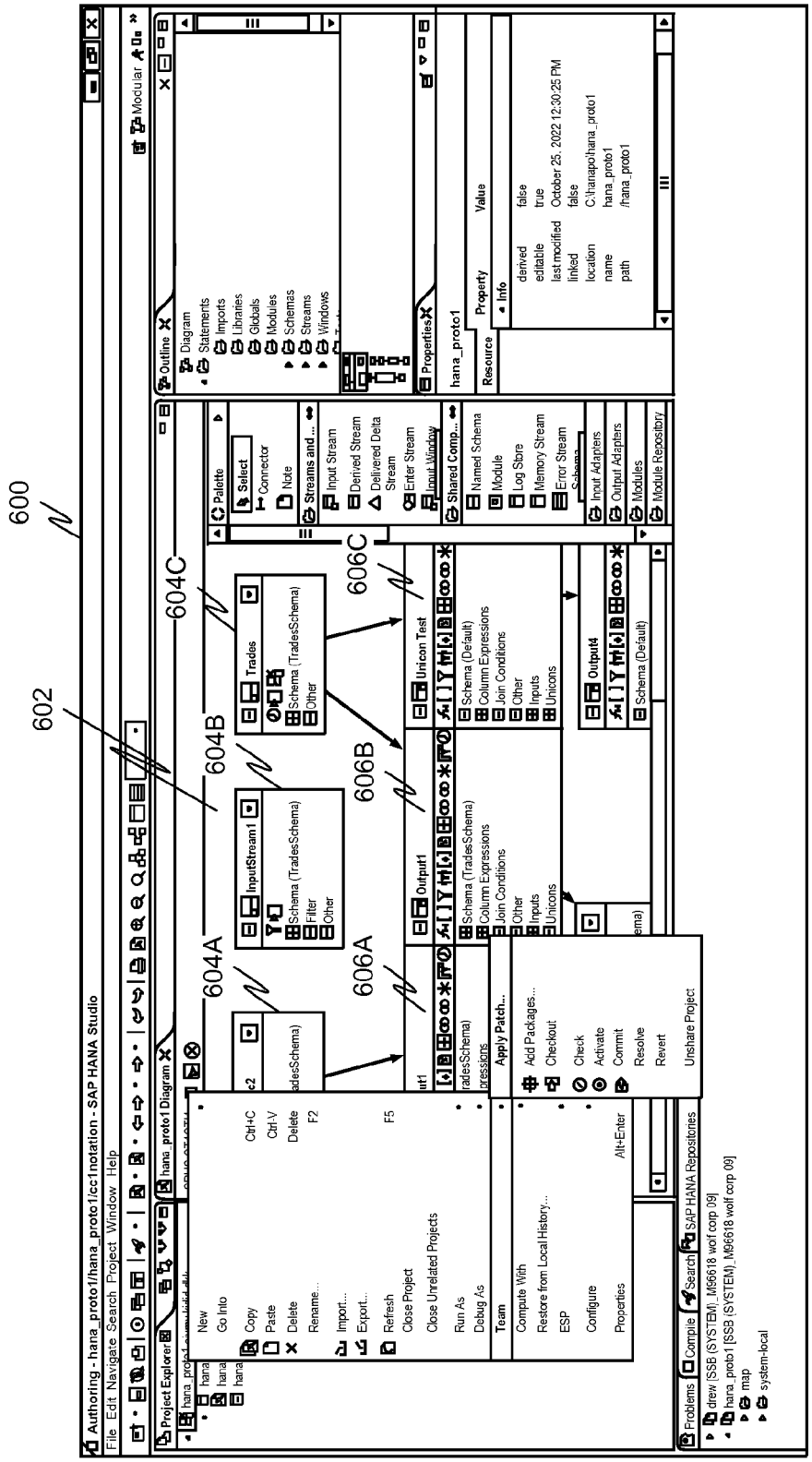
FIG. 6 is a screen capture illustrating a studio interface in accordance with an example embodiment.

In an example embodiment, integration of ESP functionality (e.g., streaming publication/subscription) into the internal database occurs through a studio program, such as studio 204 of FIG. 2. The studio 204 may be modified to allow such ESP functionality. FIG. 6 is a screen capture illustrating a studio interface 600 in accordance with an example embodiment. In the studio interface 600, a database diagram 602 may be provided where the data flow between input streams 604A, 604B, 604C and databases 606A, 606B, 606C may be presented.

In an example embodiment, each selectable item in the visual editor may be a candidate for a tabbed user interface (UI) property page. In an example embodiment, there are four different types of tabs that can appear. The first is called a General Tab and contains the most common properties that can be edited for the selected element. Another tab is a Read Only tab that shows only read only text fields for the location and stereotype of the element. A Comment tab may contain a single text field used to add a comment to the associated element. An Expression tab may then be used by certain elements described below and contains a single text field used to edit an expression block of the selected element.

Figure 7:
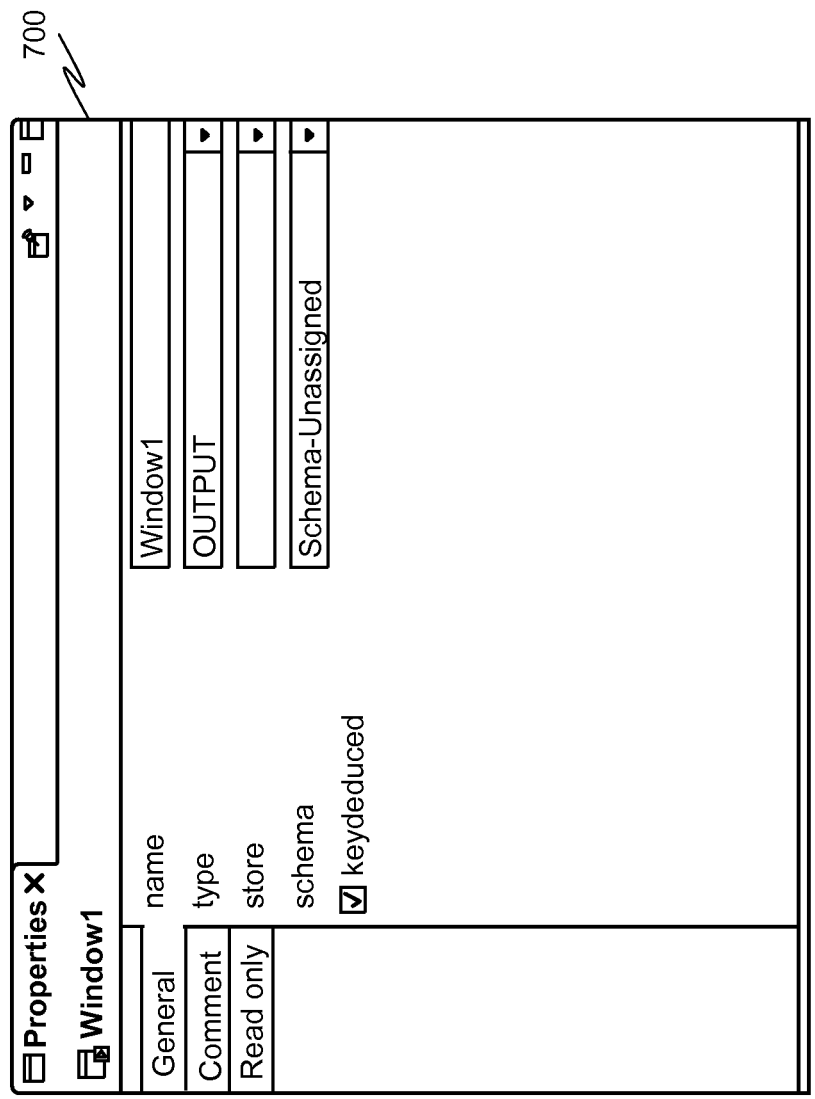
FIG. 7 is a screen capture illustrating a tabbed property sheet for a window shape in accordance with an example embodiment.

When an element is selected, the tabbed properties window may display a header containing an icon and a name label for the selected element as well as the tabs associated with the element. FIG. 7 is a screen capture illustrating a tabbed property sheet 700 for a window shape in accordance with an example embodiment.

Table 1 below defines various properties of shape types in accordance with an example embodiment.

TABLE 1

| Item | General Tab Properties | Comment Tab (Yes/No) | Expression Tab (Yes/No) |
|---|---|---|---|
| Adapter | name (Text) direction (Combo: INPUT, OUTPUT) kind (Combo: installed adapter kinds) sourceName (Combo: Input or Output stream or windows) group (Combo: Adapter start groups) | Yes | No |
| AdapterStartGroup | name(Text) nostart(Check) | Yes | No |
| AdapterStartGroupStatement | NONE | Yes | No |
| Column | name (Text) type (Combo: ccl datatypes) | No | No |
| DataSourceNormal | alias (Text) loadType (Combo: NULL, Static, DYNAMIC) useAs (Check) | No | No |
| DeltaStream | name (Text) type (Combo: OUTPUT, LOCAL) schema (Combo: list of schemas available) keydeduced (Check) | Yes | No |
| Diagram | title (Text) documentation (Text) | No | No |
| ErrorStream | name (text) type (Combo: OUTPUT, LOCAL) | Yes | No |
| ExportedStreamOrWindow | name (Text) | Yes | No |
| GroupFilter | NONE | No | Yes |
| Having | NONE | No | Yes |
| SimpleResultExpression | alias (Text) useAs (Check) | No | Yes |
| WhereClause | NONE | No | Yes |
| FlexExportedStreamOrWindow | name (Text) type (Combo: OUTPUT or LOCAL) outputKind (Combo: Delta Stream, Stream, Window) | Yes | No |
| FlexMethod | Text of method body | No | No |
| FlexOperator | name (Text) store (Combo: list of stores available) schema (Combo: list of schemas available) | Yes | No |
| Inputstream | name (Text) schema (Combo: List of available schemas) | Yes | No |

TABLE 1-continued

| Item | General Tab Properties | Comment Tab (Yes/No) | Expression Tab (Yes/No) |
|---|---|---|---|
| InputWindow | name (Text) store (Combo: list of stores available) schema (Combo: list of schemas available) | Yes | No |
| LoadModule | name (Text) | Yes | No |
| Note | Text control for the note | No | No |
| ParameterBinding | parameterInModule (Combo: list of parameters in module) parameterValue (Text) | No | No |
| Schema | name (Text) | Yes | No |
| Splitter | name (Text) type (Combo: LOCAL or OUTPUT) | Yes | No |
| Store | name (Text) kind(Combo: LOG or MEMORY) default(Check) | Yes | No |
| StoreBinding | storeInModule (Combo: list of stores in module) storeValue (Combo: list of stores in scope of parent LoadModule) | No | No |
| Stream | name (Text) type (Combo: LOCAL or OUTPUT) schema (Combo: list of schemas available) | Yes | No |
| StreamOrWindowBinding | streamOrWindowIn Module (Combo: list of inputs in module) inputSTreamOrWin do (Combo: list of stream or windows in scope of LoadModule) | No | No |
| StreamOrWindowOutputBinding | StreamOrWindowIn Module (Combo: list of outputs in module) exportedStreamOrWindow (Text) | No | No |
| Window | name (Text) type (Combo: LOCAL or OUTPUT) schema (Combo: list of schemas available) store (Combo: list of stores available) keydeduced (Check) | Yes | No |
| Import | NONE | Yes | No |
| SplashParameterDeclaration | name (Text) type (Combo: ccl data types) | No | No |
| DeclareGlobalBlock | NONE | Yes | No |
| Library | name (Text) language (Combo: C or Java) | Yes | No |
| DeclareLocalBlock | NONE | Yes | No |
| SplashVarDeclaration | name (Text) type (Combo: ccl data types) | No | No |
| GroupByClause | List Available Columns | No | No |

TABLE 1-continued

| Item | General Tab Properties | Comment Tab (Yes/No) | Expression Tab (Yes/No) |
|---|---|---|---|
| | List Selected Columns Using the <, > buttons will remove/add assigned values | | |
| GroupOrderByClause | List Available Columns List Selected Columns Using the <, > buttons will remove/add assigned values. Radio (None, Ascending, Descending), when checked and > is presses will use Asc or Desc modifier in group order item, | No | No |
| AgingPolicy | Aging Time (text allows user to enter interval expression and has completion proposal for interval units). The adjacent [Select] button allows the user to select a declare block INTERVAL parameter. Aging Field (Combo: List of columns that can be used for this value) Max Aging Field Value (allows user to enter interval expression and has completion proposal for interval units). The adjacent [Select] button allows the user to select a declare block INTEGER parameter) Aging Time Field(Combo: List of columns that can be used for this value) | No | No |
| AutoGenerateClause | List Available Columns (of type long) List Autogenerate Columns Using the <, > buttons will remove/add assigned values. From (Text). The [Select] button allows user to select a LONG parameter to be used for the From portion of the autogenerate clause. | No | No |
| DeclareGlobalBlock | Block of CCL parameter declarations corresponding to the global DECLARE END block of a CCL file. | Yes | No |

TABLE 1-continued

| Item | General Tab Properties | Comment Tab (Yes/No) | Expression Tab (Yes/No) |
| --- | --- | --- | --- |
| DeclareLocalBlock | Block of CCL parameter declarations corresponding to the local DECLARE END block of a Stream, DeltaStream, Window or FlexOperator. | | |
| SplitterSelect (Inputs compartment of Splitter shape) | Alias | No | No |

As described above, in an example embodiment, a new element in ESP is provided that will allow users to establish a reference to an in-memory database table in an ESP model. Users will be able to use this reference to provide user input to define join conditions with regular ESP windows and streams.

The reference may be an ESP element similar to what streams/windows are. This new reference element then can be used to receive user input that defines/selects a database service, the name of the table from which information should be retrieved, the schema of the information in the reference table, and optionally specify a primary key for the reference table. The reference can be enabled, for example, based on user input, to attempt reconnection to the database when a connection is lost during data flow. The system can receive user input that specifies the number of times to retry and how long to wait between retry attempts.

When a customer, such as a user, wishes to enrich streaming data with information from a database, they may need information about the table in the database from which the information will be retrieved. The customer may define a new reference in their project to represent this database table. The reference can be dropped into the project from the studio palette. After dropping down the reference, the user may add a service entry that represents the database in which this table is stored. Once the service entry is specified, the user can select from a list of the tables in the database. Once an individual table is specified, the user will have the opportunity to select individual columns in the table that will be represented in the schema of the reference. The studio may also be able to detect the primary key on the database table if it exists and provide the primary key to the user. The primary key of a reference matches the primary key on the underlying database table. If the user does not wish to use the studio, the reference can be created by editing ESP directly.

Once the reference is defined, the customer can use it in joins to produce either a stream or a window. Typical use cases for these joins would involve data lookup and enrichment. The reference may only be used in joins and cannot be selected from directly by derived elements.

Users will be able to create a reference in their modules, but the syntax inside a module will only allow the user to specify the schema and primary key information. Any reference created inside a module will need to be bound to a concrete reference at module load time. This will work similarly to the way stores are bound in modules today.

Upon startup of the project, the reference would validate that the schema provided by the user for the reference is valid. In order for a schema to be valid, the column names in the schema should match columns in the source database table and the types should be compatible. If the user specifies a primary key for the reference, it too can be validated to make sure it matches the primary key of the underlying source. If the primary key of the underlying source cannot be determined or does not match what was specified, then it can be flagged as an error. If the reference could not connect to the database at startup, the specified table did not exist, or the schema was incompatible, the user could see an error message in the log, and the project may stop.

For each record that arrives to the join, the reference can query the database specified to retrieve appropriate records to match the join condition. If the database connection goes down (and retries, if any, fail), the join need not process the row. If the bad records behavior is activated, the record triggering the join can be written to a file and to the error stream similarly to what happens today with windows and bad records.

As described above, this feature may necessitate the definition of a new ESP object called a reference, and call for changes to the existing syntax for creating and loading modules. In an example embodiment, ESP syntax will be added that allows the user to define a reference in their project. The syntax of the reference object can be different between the main project and a module.

Syntax:
When defined in the main project (outside a module):

```
CREATE REFERENCE name
schema_clause
[PRIMARY KEY (column1, column2 ...)]
PROPERTIES service = 'service name',
source = 'table name'
[, maxReconnectAttempts=integer]
[, reconnectAttemptDelayMSec = integer]
[, exitOnConnectionError = true]
;
```

When defined inside a module:

```
CREATE REFERENCE name
schema_clause
[PRIMARY KEY (column1, column2 ...)]
;
```

Note that in a Reference Table, the schema_clause may not be optional and might not be deduced like in derived windows/streams. When defining a concrete instance of a reference in a project (not inside a module), the column names in the reference's schema should match the database column names exactly. When the schema is defined in a module, they need not match the names to which the reference will be bound at module load time. The data types and order of the schema between the reference in the module, and the reference to which it is bound, should match (i.e., same number of columns, and same datatypes). The primary keys of the reference in the module should refer to the same columns that make up the primary key in the reference to which it is bound.

The PRIMARY KEY clause is optional, and the lack of a primary key clause means the reference does not contain a primary key (i.e., will not be able to produce a join window). A database table without a primary key will affect the types of joins this reference table can participate in.

The properties clause supports the following properties:

TABLE 2

| Property | Description | Value | Required |
| --- | --- | --- | --- |
| Service | The service to use to connect to the data. Must be defined in the service.xml file. | string | Required |
| source | The table name for the source data in the database. | String | Required |
| sourceSchema | The database schema that the source is in | String | Optional. Required if the reference has a primary key defined |
| maxReconnectAttempts | The number of times to retry a connection if it fails during dataflow. Note that retries will block the server from processing any further rows until a reconnection is established or the number of retry attempts is exhausted. | integer | Optional. If not specified, no reconnect attempt will be made when the connection is lost before discarding the row. The adapter will however retry the connection for the next row that enters the join. If set to −1, the system will retry without limit. |
| reconnectAttemptDelayMSec | When the maxReconnectAttempts are specified, this setting will control how many milliseconds the server will wait between retry attempts. | integer | Optional. If no value is specified, and the maxReconnectAttempts is greater than 0, 500 ms will be waited between retry attempts. |
| exitOnConnectionError | If set to true, ESP will terminate if a connection drops and all reconnection attempts fail. The error together with the row triggering the join will be journalized. | Boolean | Default false. By default ESP will not terminate on dropped connections. |

In an example, a customer table exists in an external database. The table in the database called customerTable includes a customer ID, and the customer's full name, address and other details. The primary key of the database table is the customerID column. The user wishes to process streaming orders from customers (who are identified in the source stream by their customer ID), and join it with the customer information to produce an output stream. The output stream will contain the order ID, along with the customer's full name and address that was pulled from the database table when the order came through.

```
CREATE REFERENCE customerRef SCHEMA
(customerID integer, fullName string, address
string) PRIMARY KEY (customerID) PROPERTIES
service='databaseServiceName', source =
'customerTable';
CREATE INPUT STREAM orderStream SCHEMA (
orderID integer, customerID integer, itemID
integer);
CREATE OUTPUT STREAM
orderWithCustomerInfoStream SCHEMA (orderID
integer, customerName string, customerAddress
string) AS SELECT orderStream.orderID,
customerRef.fullName, customerRef.address FROM
orderStream, customerRef WHERE
orderStream.customerID =
customerRef.customerID;
```

When creating a new module, the user may be instructed to list all of the references created in that module in the CREATE MODULE statement. In order to allow this, a new optional clause called REFERENCES may be added.

Syntax:

```
CREATE MODULE modulename
    IN input1 [, ...]
    OUT output1 [, ...]
    [REFERENCES reference1 [, ...] ]
    BEGIN
    statements;
    END;
```

Usage:

The new REFERENCES clause is optional, but should be specified if there are any references in the module. If there are no references in the module, the clause may not be specified. The name of every reference defined in the module should be listed in the comma delimited list of the clause.

For a load module, the syntax may be:

```
LOAD MODULE moduleReference AS
moduleidentifier
    IN
        input-streamorwindow-inmodule =
streamorwindow-parentmodule [, ...]
    OUT
        output-streamorwindow-inmodule =
streamorwindow-parentmodule [, ...]
    [ PARAMETERS
        input-parameters-inmodule = values-
parentmodule [, ...]
    ]
    [ STORES
        store-inmodule = store-parentmodule [,
...]
    ]
    [ REFERENCES
        reference-inmodule = reference-
parentmodule [, ...]
    ]
    ;
```

Usage:

The REFERENCES clause may be added to the load module statement. This clause should not be specified if there are no references in the module being loaded. If there are references in the module being loaded, the clause should be present and contain a comma delimited list of bindings between references in the module to references in the parent module (or project). There should be a binding specified for every reference in the module. The reference to which each reference in the module is bound should be compatible. A reference may be bound to a reference in the project if the schema and primary key are compatible. A compatible schema means that the number, order, and type of the data types in the schema are identical. The names do not need to match. The primary key is compatible if the primary key on the reference in the module may point to the same columns as the primary key in the reference to which it is bound.

For Splash, the syntax may be:

```
CREATE SCHEMA s1(c1 integer, c2 integer, c3
integer );
CREATE INPUT WINDOW w1 SCHEMA s1 primary
key(c1,c2);
// Replace with Reference Definition
CREATE REFERENCE r1 schema s1
PROPERTIES service="service"
source="atable";
CREATE FLEX refex
    in w1, r1
    out output window refex schema (c1 integer,
c2 integer, c3 integer, refc3 integer )
primary key(c1,c2)
    begin
        on w1 {
// Accesssing a reference in Flex is not any
different from
// accessing regular window.
            r1_iterator := getIterator(r1_stream);
            setRange( r1_iterator, c1, w1.c1 );
            typeof(r1) ref := getNext(r1_iterator);
            while(not(isnull(ref))) {
                refex := [c1 = w1.c1; c2 = w1.c1;
| c3 = w1.c3;
refc3 = ref.c3;];
                output setOpcode(refex, upsert);
                ref := getNext(r1_iterator);
            }
            deleteIterator(r1_iterator);
        };
        on r1 {
            /* Any code here is always ignored. */
        };
    end;
```

Usage:

A REFERENCE may be query-able from SPLASH code, similar to the way windows can be queried. Users may need to retrieve an iterator over the REFERENCE, and then iterate over the rows.

The reference provides the ability to join an ESP window or stream with data from a database system (table or view). When defining the schema for the reference in ESP, the user may match the column names in the schema to the column names in the database. If the names do not match, an error may be output to the logs at runtime and the project will not run.

In an example embodiment, a reference is not joined directly with another reference. In a multi-table join, multiple references can be involved as long as they are not directly joined.

When using a reference that doesn't have a primary key in a join, in some example embodiments there can be at most one streaming element (stream, window, or delta stream with a keep clause) in the join.

In an example embodiment, there may be some restrictions that will be enforced by the compiler when defining a join that involves a reference. These are described in Table 3 below:

TABLE 3

| If the join element is a . . . | Restrictions |
|---|---|
| Stream, Window or Window with Aggregation | The reference may never be the outer side of the join (i.e., in a LEFT OUTER JOIN the reference must be on the right side, in a RIGHT OUTER JOIN on the left side) Reference can't be involved in a FULL OUTER JOIN If the reference used in the join doesn't have a primary key defined, the join can contain only one streaming element |
| Stream or Window with Aggregation | If the reference has a primary key defined but does not have its entire primary key bound, the join can contain only one streaming element |
| Window | The reference must be joined with a window or delta stream with a keep clause The reference must define a PRIMARY KEY The entire PRIMARY KEY of the reference table must be bound in the join conditions (in the ON clause) The primary key of the join window, if not deduced, must not contain any columns from the reference table |

Figure 8:
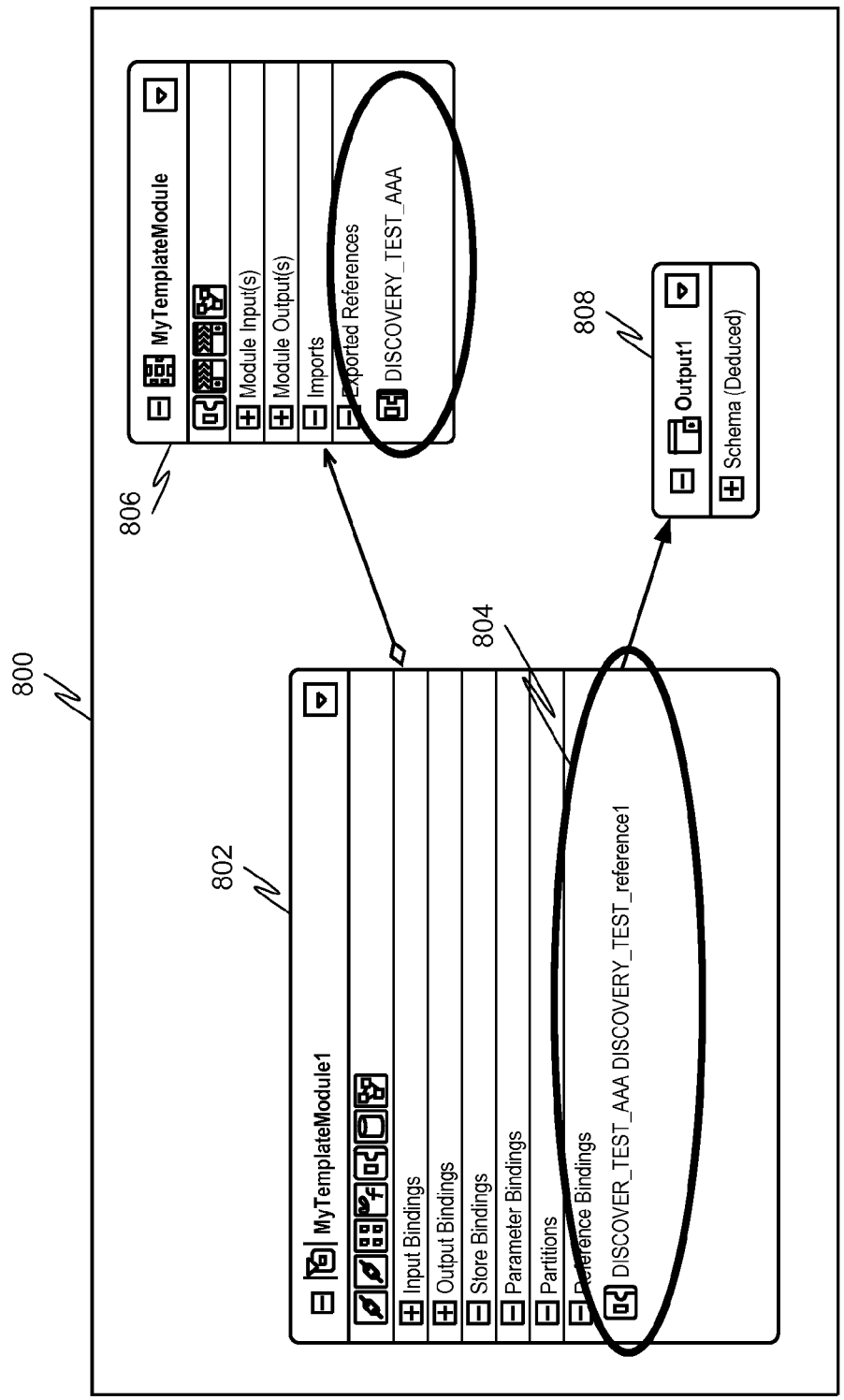
FIG. 8 is a screen capture illustrating a user interface in accordance with an example embodiment.

FIG. 8 is a screen capture illustrating a user interface 800 in accordance with an example embodiment. This user interface 800 provides for visual authoring via the use of a module shape 802, and more specifically a module shape compartment item 804 for references. The references can then be linked to other template modules, such as template module 806 and to output schemas 808.

Figure 9:
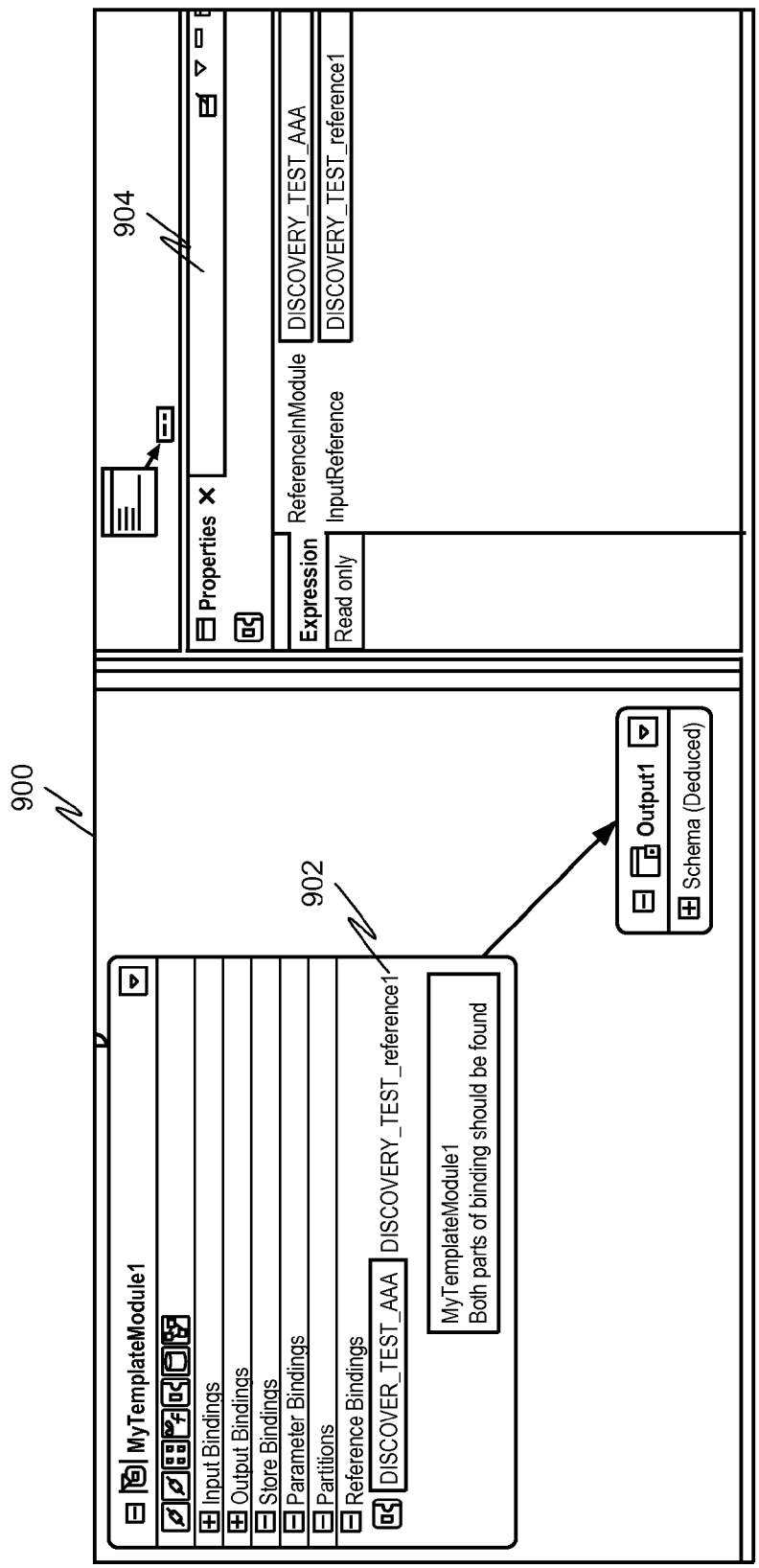
FIG. 9 is a screen capture illustrating a user interface in accordance with another example embodiment.

FIG. 9 is a screen capture illustrating a user interface 900 in accordance with another example embodiment. This user interface 900 includes a modularity reference 902 binding a tabbed property 904.

Figure 10:
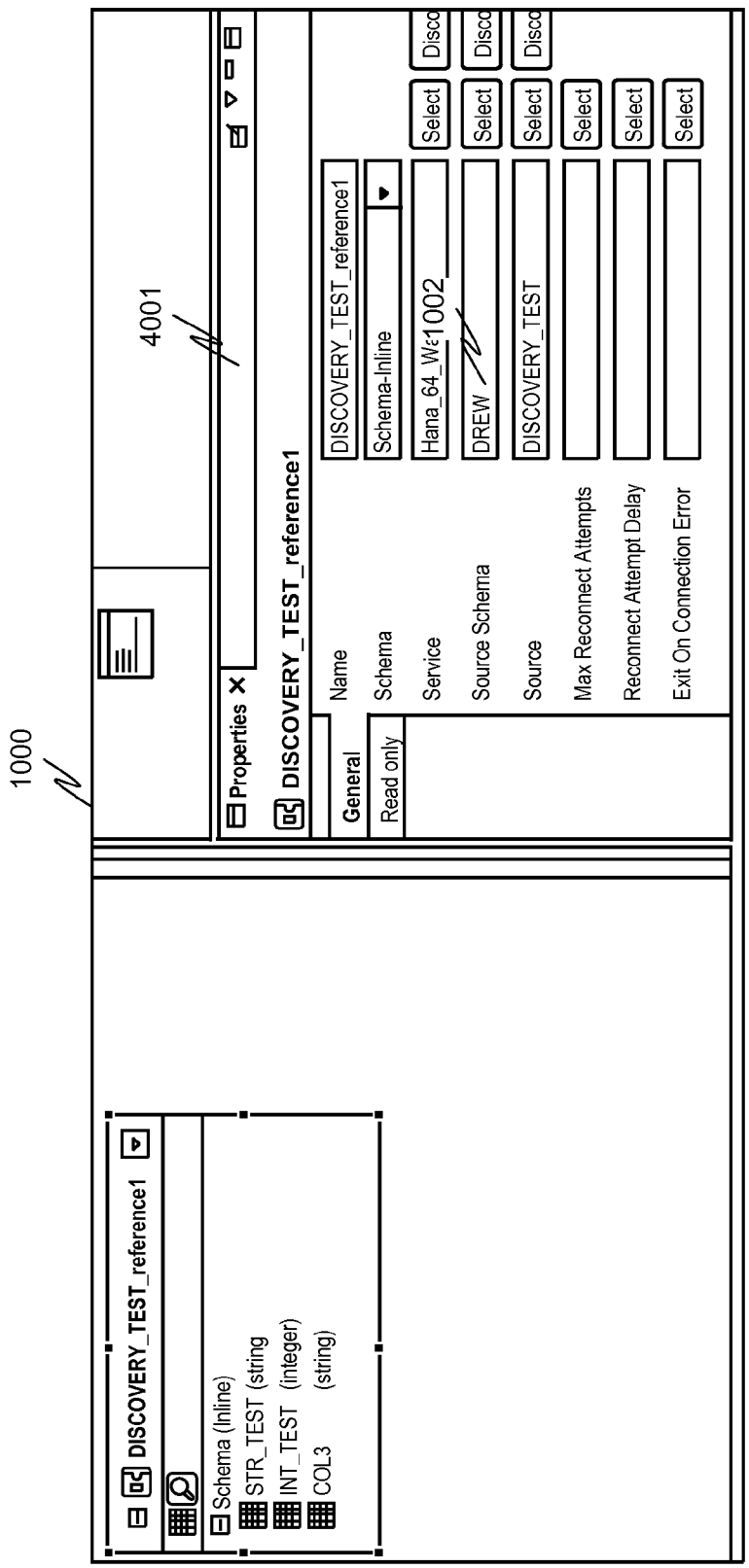
FIG. 10 is a screen capture illustrating a user interface in accordance with another example embodiment.

In an example embodiment, an additional property can be added to references, known as sourceschema. This property can be set via the reference tabbed property page. The studio can provide the ability to discover sourceschemas at a given service using the database adapter API. If the sourceschema property is set, then during table discovery the studio can pass the sourceschema value in order to return discovered tables at the specific schema. FIG. 10 is a screen capture illustrating a user interface 1000 in accordance with another example embodiment. As can be seen, the sourceschema property 1002 may be set via the reference tabbed property page 1004.

Figure 11:
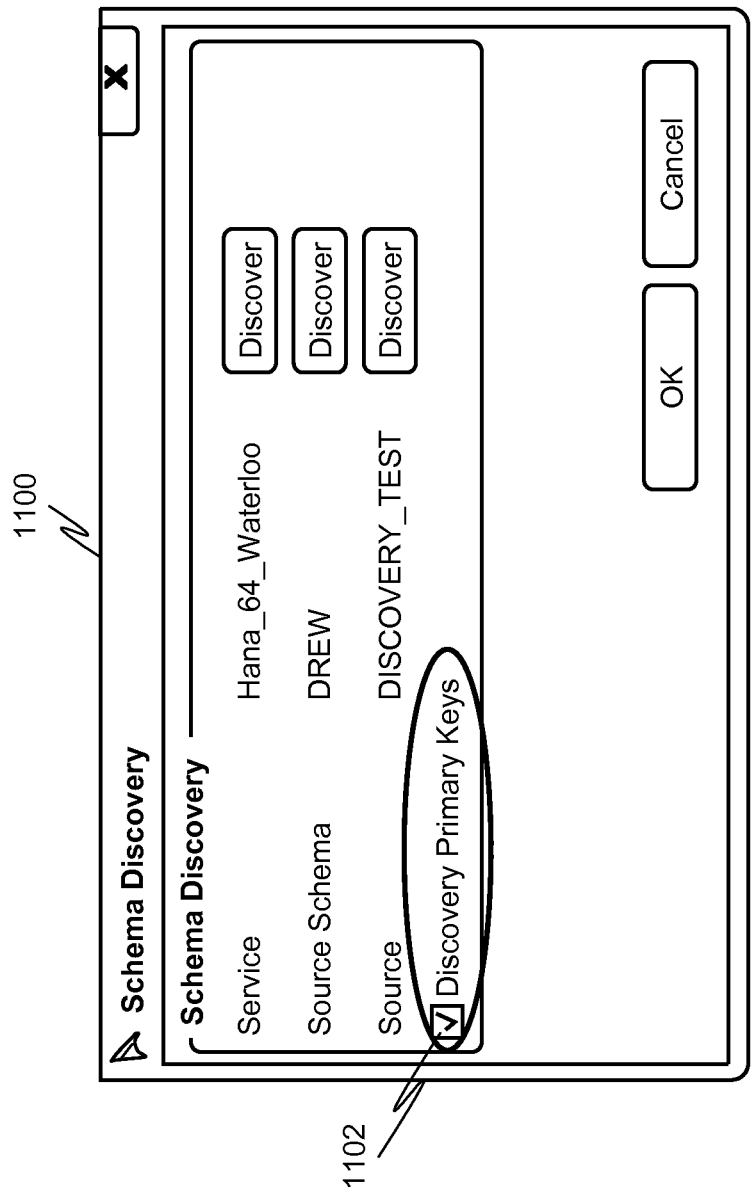
FIG. 11 is a screen capture illustrating a user interface in accordance with an example embodiment.

FIG. 11 is a screen capture illustrating a user interface 1100 in accordance with an example embodiment. As can be seen, a checkbox 1102 may be utilized on the schema discovery window, which indicates that primary keys should be discovered if they exist.

Figure 12:
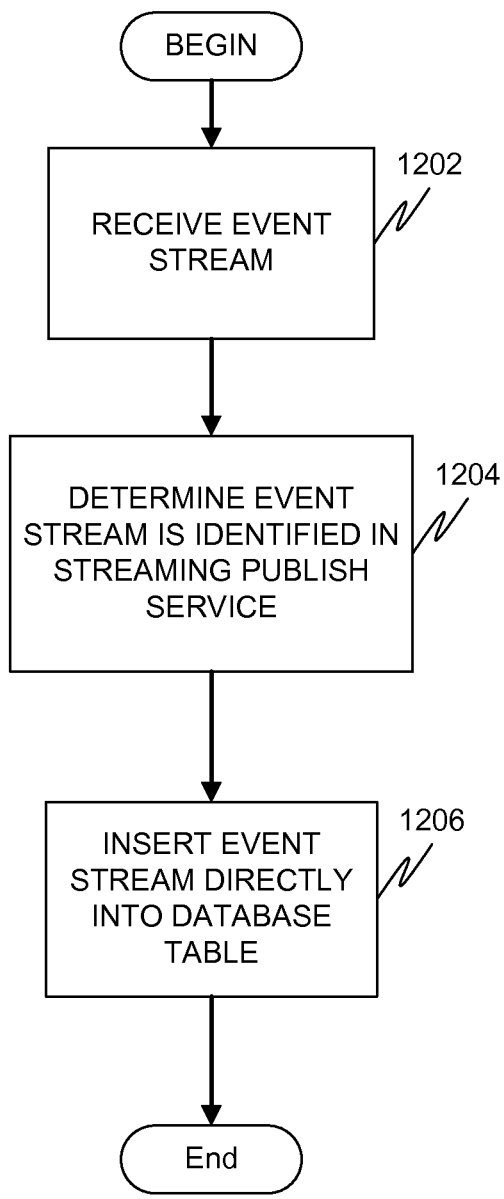
FIG. 12 is a flow diagram illustrating a method or performing event stream processing in accordance with an example embodiment.

FIG. 12 is a flow diagram illustrating a method 1200 for performing event stream processing in accordance with an example embodiment. At operation 1202, an event stream is received, the event stream comprising a real time indication of events occurring. At operation 1204, it may be determined that the event stream is identified in a streaming publish service inside a database. At operation 1206, the event stream may be inserted directly into one or more database tables in the database based on the determining.

Example Mobile Device

Figure 13:
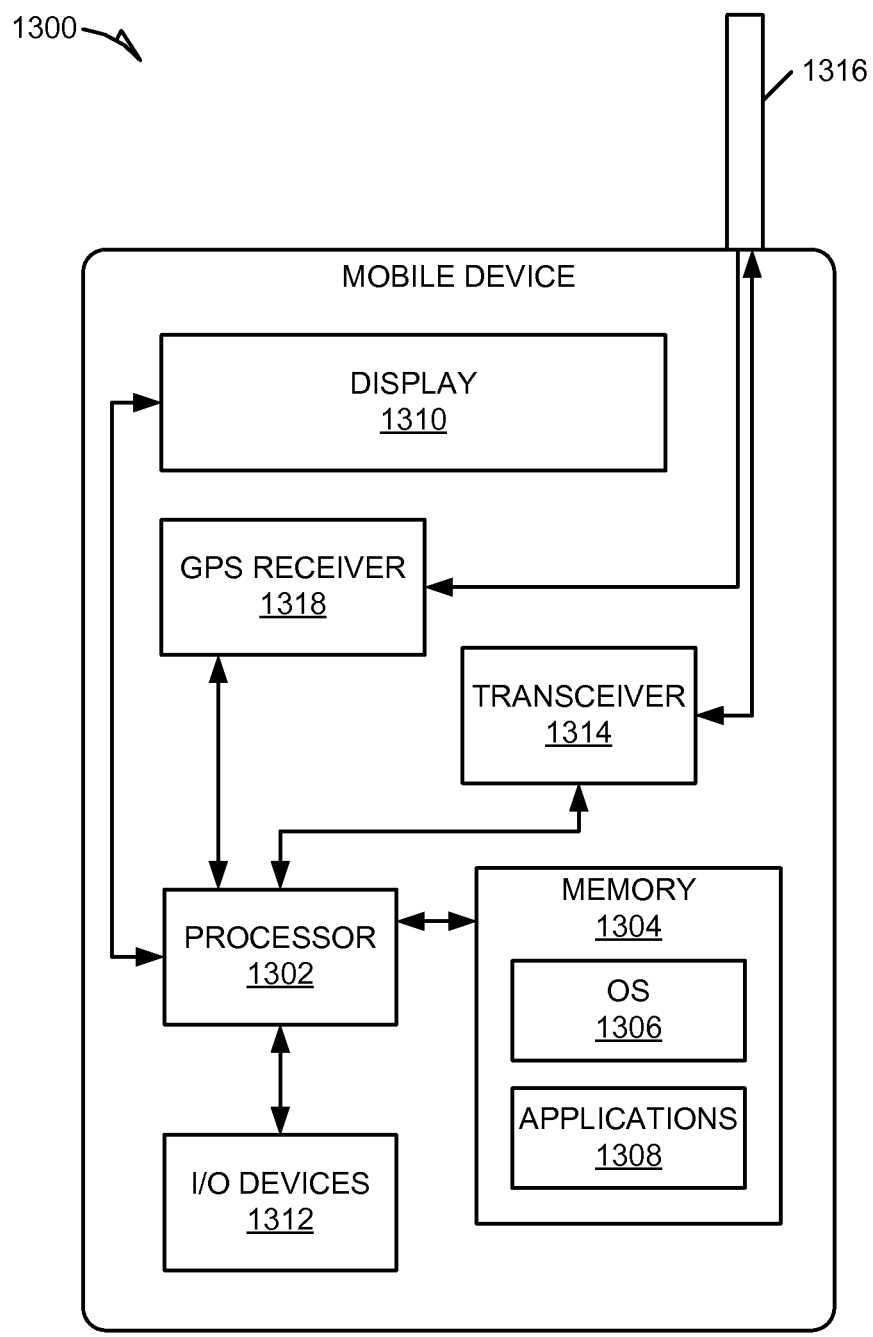
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308. The processor 1302 may be coupled, either directly or via appropriate intermediary hardware, to a display 1301 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 1302 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 1302 or other programmable processor 1302) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 1302 configured using software, the general-purpose processor 1302 may be configured as respective different hardware-implemented modules at different times. Software may accordingly configure a processor 1302, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1302 or processor-implemented modules. The performance of certain of the operations may be distributed among the one or more processors 1302, not only residing within a single machine, but deployed across a number of machines. In some example embodiments, the processor 1302 or processors 1302 may be located in a single location (e.g., within a home environment, an office environment or as a server farm), while in other embodiments the processors 1302 may be distributed across a number of locations.

The one or more processors 1302 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 1302, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 1302 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 1302), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
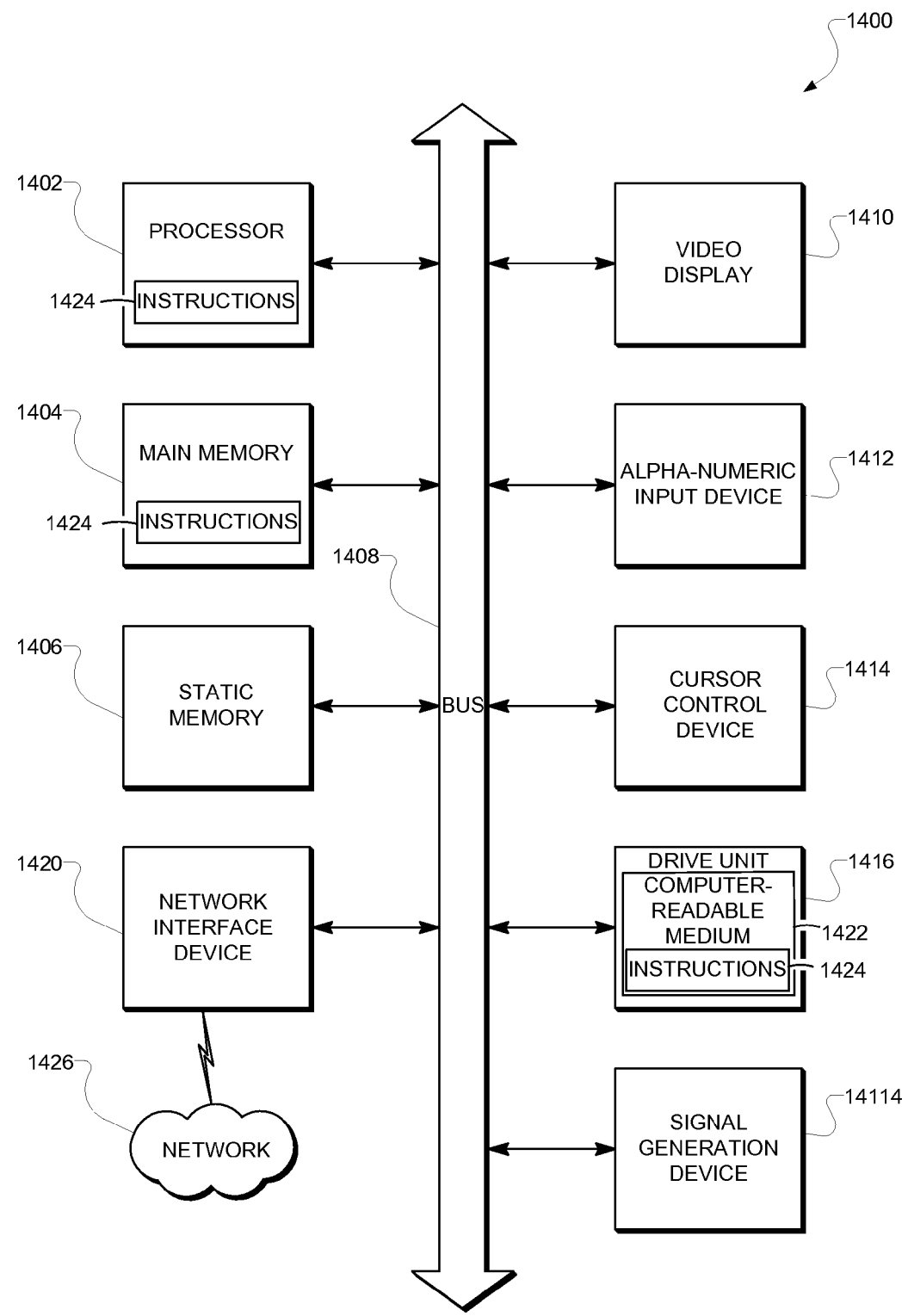
FIG. 14 is a block diagram of a machine in the example form of a computer system within which instructions may be executed for causing the machine to perform any one or more of the methodologies discussed herein.

FIG. 14 is a block diagram of a machine in the example form of a computer system 1400 within which instructions 1424 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation or cursor control device 1414 (e.g., a mouse), a disk drive unit 1416, a signal generation device 1418 (e.g., a speaker) and a network interface device 1420.

Machine-Readable Medium

The disk drive unit 1416 includes a machine-readable or computer-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable or computer-readable media 1422.

While the machine-readable or computer-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The terms "machine-readable medium" and "computer-readable medium" shall also be taken to include any tangible medium that is capable of storing, encoding or carrying instructions 1424 for execution by the machine and that causes the machine to perform any one or more of the methodologies of the present disclosure or that is capable of storing, encoding or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for performing event stream processing, the method comprising:
   receiving, at a computer system, an event stream, the event stream comprising a real time indication of one or more events occurring;
   determining, by the computer system, that the event stream is identified in a first table inside a streaming publish service maintained inside a database, the determining including comparing an identification of the event stream to one or more entries in the first table; and
   inserting, by the computer system, the event stream directly into one or more database tables, other than the first table, in the database based on the determining.

2. The method of claim 1, wherein the database is an in-memory database.

3. The method of claim 1, wherein the determining is performed by locating a reference to a database table inside the event stream.

4. The method of claim 3, wherein the reference is inserted into the event stream by a designer utilizing an event stream element assigned only to providing the reference.

5. The method of claim 4, wherein the reference, when executed, prompts a user to define or select a database service, a name of a table from which the information should be received, and a schema of the information in the table.

6. The method of claim 5, wherein the reference, when executed, additionally prompts the user to specify a primary key for the table.

7. The method of claim 5, wherein the reference, when executed, additionally prompts the user to enable the reference to attempt reconnection to the database when a connection is lost during data flow.

8. A database comprising:
   data storage including one or more database tables; and
   a database management system including a streaming publish service, the streaming publish service executable by a processor and configured to determine that an incoming event stream is identified in first table inside a streaming publish service, the determining including comparing an identification of the event stream to one or more entries in the first table and to insert the event stream directly into the one or more database tables, other than the first table, in the data storage based on the determining.

9. The database of claim 8, wherein the database is an in-memory database.

10. The database of claim 8, wherein the determining is performed by locating a reference to a database table inside the event stream.

11. The database of claim 10, wherein the reference is inserted into the event stream by a designer utilizing an event stream element assigned only to providing the reference.

12. The database of claim 11, wherein the reference, when executed, prompts a user to define or select a database service, a name of a table from which the information should be received, and a schema of the information in the table.

13. The database of claim 12, wherein the reference, when executed, additionally prompts the user to specify a primary key for the table.

14. The database of claim 12, wherein the reference, when executed, additionally prompts the user to enable the reference to attempt reconnection to the database when a connection is lost during data flow.

15. A non-transitory machine-readable storage medium comprising instructions, which when implemented by one or more machines, cause the one or more machines to perform operations comprising:
   receiving an event stream, the event stream comprising a real time indication of one or more events occurring;
   determining, by the computer system, that the event stream is identified in a first table inside a streaming publish service maintained inside a database, the determining including comparing an identification of the event stream to one or more entries in the first table; and
   inserting, by the computer system, the event stream directly into one or more database tables, other than the first table, in the database based on the determining.

16. The non-transitory machine-readable storage medium of claim 15, wherein the database is an in-memory database.

17. The non-transitory machine-readable storage medium of claim 15, wherein the determining is performed by locating a reference to a database table inside the event stream.

18. The non-transitory machine-readable storage medium of claim 17, wherein the reference is inserted into the event stream by a designer utilizing an event stream element assigned only to providing the reference.

19. The non-transitory machine-readable storage medium of claim 18, wherein the reference, when executed, prompts a user to define or select a database service, a name of a table from which the information should be received, and a schema of the information in the table.

20. The non-transitory machine-readable storage medium of claim 19, wherein the reference, when executed, additionally prompts the user to specify a primary key for the table.

* * * * *